June 23, 1970 E. ROESCH 3,517,326

GATE RELAXATION OSCILLATOR

Filed June 24, 1968

United States Patent Office 3,517,326
Patented June 23, 1970

3,517,326

GATE RELAXATION OSCILLATOR

Edouard Roesch, Le Locle, Switzerland, assignor to Dixie S.A., Neuchatel, Switzerland Filed June 24, 1968, Ser. No. 739,527
Claims priority, application Switzerland, June 30, 1967, 9,340/67
Int. Cl. H03b 5/20
U.S. Cl. 331—57 6 Claims

ABSTRACT OF THE DISCLOSURE

A gate relaxation oscillator of the type having a ring of gates fed-back in itself and RC-coupling means between gate inputs and outputs, the multivibrator oscillating at a frequency determined by the values of elements of said RC-coupling means.

This invention relates to a gate relaxation oscillator comprising a ring of gates fed back in itself and including RC-coupling means determining the oscillating frequency of the oscillator. Oscillators of this type are known and are particularly used as pulse generators in logical circuits. In prior oscillators a direct capacitive coupling is usually provided between the output of one gate and the input of the next gate of the ring, whereby the resistor of the RC-member determining the time or frequency is connected between the input of the gate controlled through the coupling condenser and a potential source outside the feed-back ring. This layout of the oscillator generally involves a relatively complicated and unstable circuit. Two RC-coupling members are usually required and the type of coupling means mentioned above results in an indefinite and consequently unstable control of the gates.

It is an object of this invention to simplify the circuit and at the same time to increase the stability of oscillators of the above type by providing the elements of an RC-coupling means between the input of one gate and gate outputs of opposite phase respectively. It will be shown in the following with reference to an embodiment of the invention illustrated in the accompanying drawing by way of example that it is possible to provide one single RC-coupling member only and to obtain definite and stable operating conditions.

Figure 1:
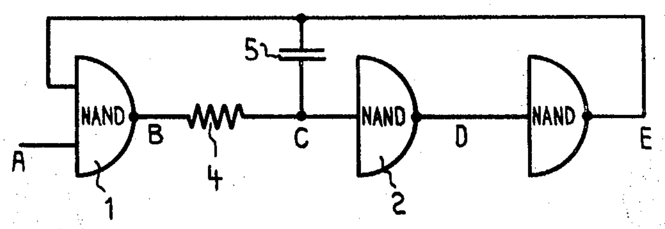

FIG. 1 of the drawing is a circuit diagram of the embodiment and

Figure 2:
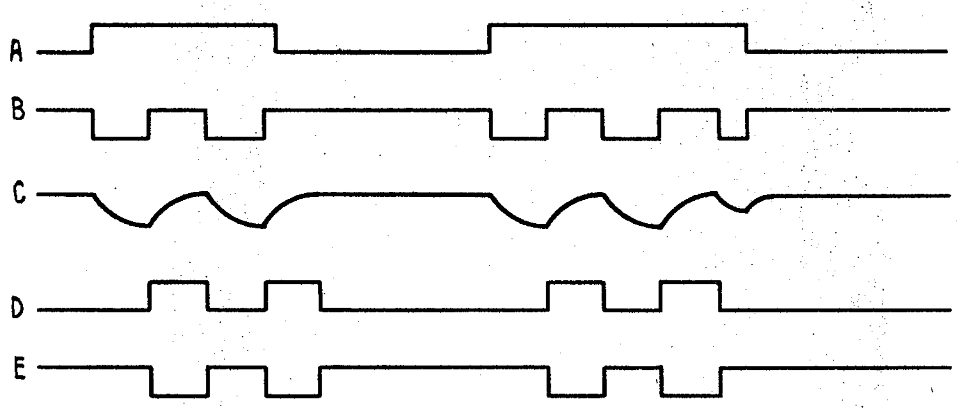

FIG. 2 illustrates various signals occurring in the circuit.

The illustrated circuit has three similar NAND-gates 1, 2 and 3. Each gate has two control inputs whereof only the one is used on gates 2 and 3. Input A of gate 1 serves for external control for start and stop of the oscillator, while the second input of this gate is connected to the output of gate 3. The output B of gate 1 is connected to the input C of gate 2 through a resistor 4. Further, the output E of gate 3 is connected to the input of gate 2 through a condenser 5. The output of gate 2 is connected to the input of gate 3 by means of a conductor D.

It is obvious from FIG. 1 that gates 1 to 3 are connected in a ring fed-back into itself, because the output of each gate is cyclically connected to the input of the succeeding gate, whereby the ring is closed by a feedback conductor from the output of gate 3 to the one input of gate 1.

The operation of the circuit will now be explained with reference to FIG. 2. In the out condition, during which gate 1 is maintained in a predetermined condition by a potential 0 at the input A, the potentials at the different electrodes A to E designated in FIG. 1 are indicated at the left end of FIG. 2. It is seen that equal positive potentials appear at B and C, that is, no voltage drop occurs in resistor 4, and condenser 5 is completely discharged, since output E is at the same potential as input C. When gate 1 is reversed by applying a positive pulse to its control input A a corresponding change of potential occurs at the output B of gate 1 where the positive potential drops to 0. Condenser 5 is now charged through resistor 4 until the potential at the input C has dropped practically to 0. This condition is reached at the end of a delay time determined by elements 4 and 5, whereafter the gate 2 is reversed and a positive potential appears at its output. Gate 3 is immediately reversed and its output acting on gate 1 again reverses the latter. Thereby the potential at the output B of gate 1 increases to a certain positive value and condenser 5 is gradually discharged through resistor 4 so that the potential at input C of gate 2 increases until gate 2 is reversed after a predetermined delay time and reverses gates 3 and 1. In this manner pulses are periodically produced which may be collected at a suitable place, for instance at the output E. When the potential at the control input A returns to 0 gate 1 is immediately reset into its initial rest condition unless it already assumed this condition. When the gate 1 is in its rest condition upon arrival of the stop signal the pulses appearing at electrodes D and E are still terminated, but at the end of the last pulse gate 1 is no longer reversed by the output E. However, when gate 1 is in its operative condition upon arrival of the stop signal as indicated at the right in FIG. 2, outputs D and E are already in rest condition and remain in this condition because no further reversal of gate 2 occurs.

It is seen from FIG. 1 that the members 4 and 5 of the RC-coupling means acting onto the input of gate 2 are connected to the outputs of two succeeding gates 3 and 1 respectively of the closed ring of gates, these outputs being in phase-opposition during the self-sustained oscillation of the oscillator. In other language, the resistor 4 interconnects the output of one gate with the input of the following gate while the condenser 5 bridges the preceding gate. Under these circumstances particularly definite potential conditions are obtained at the input terminals of the RC-coupling, this resulting in correspondingly definite control conditions at the input of gate 2. Therefore, the illustrated circuit is simple in that a single RC-member is required, and its operation is reliable and stable.

The circuit may be controlled at any one of gates 1 to 3, but somewhat different conditions are obtained when gate 2 or 3 is controlled from the control input A, in that the pulses are cut off upon arrival of the stop signal.

What is claimed:

1. A gate relaxation oscillator comprising a ring of three inverting gates fed back in itself by coupling the output of each gate to an input of the gate following in the ring, RC-coupling means being connected between at least one gate output and gate input for determining the oscillating frequency, one terminal of the resistor and capacitor of an RC-coupling means being connected each to the gate input of one gate, the other terminal of one of said resistor and capacitor being connected to a gate output of one phase and the other terminal of the other of said resistor and capacitor being connected to a gate output of opposite phase respectively.

2. An oscillator according to claim 1, comprising three gates and a single RC-coupling means, the resistor of the RC-coupling means interconnecting the output and input respectively of gates following each other in the ring while the condenser of the RC-coupling means bridges said resistor and the gate preceding in the ring.

3. An oscillator according to claim 2, comprising a control input for external control at the said preceding gate.

4. An oscillator according to claim 2, comprising a control input for external control at the gate controllable by said RC-coupling means.

5. An oscillator according to claim 2, comprising a control input for external control at the gate following the gate controllable by said RC-coupling means.

6. A gate relaxation oscillator comprising a first, second and third inverting logic gate having each an output and at least one input, said gates being cyclically connected to form a feed-back ring by coupling means between the output of each gate and an input of the following gate, a resistor connected between the output of said first gate and the input of said second gate of the ring, a condenser connected between said input of the second gate and the output of said third gate, and a second input on one of said gates connected for exteral control.

References Cited

UNITED STATES PATENTS

| | | | |
|---|---|---|---|
| 3,350,659 | 10/1967 | Henn | 331—57 |
| 3,382,455 | 5/1968 | Rapp | 331—111 |
| 3,395,362 | 7/1968 | Sutherland | 331—57 |

ROY LAKE, Primary Examiner

S. H. GRIMM, Assistant Examiner

U.S. Cl. X.R.

331—135, 143, 153, 172; 307—215, 223

UNITED STATES PATENT OFFICE
CERTIFICATE OF CORRECTION

Patent No. 3,517,326 Dated June 23, 1970

Inventor(s) Edouard Roesch

It is certified that error appears in the above-identified patent and that said Letters Patent are hereby corrected as shown below:

In the heading to the printed specification, lines 3 and 4, "Dixie S.A., Neuchatel, Switzerland" should read -- Dixi S.A., LeLocle, Switzerland --. Column 2, line 52, before "gates" insert -- logic --.

Signed and sealed this 27th day of April 1971.

(SEAL)
Attest:

EDWARD M.FLETCHER,JR.
Attesting Officer

WILLIAM E. SCHUYLER, JR.
Commissioner of Patents

FORM PO-1050 (10-69)

USCOMM-DC 60376-P69
U.S. GOVERNMENT PRINTING OFFICE : 1969 O—366-334